(12) United States Patent
Sherrer et al.

(10) Patent No.: US 6,722,721 B2
(45) Date of Patent: Apr. 20, 2004

(54) PICKUP TRUCK FOLDABLE RAMP TAILGATE

(76) Inventors: Earl W. Sherrer, P.O. Box 179, Elk City, ID (US) 83525; Patrick T. Doherty, P.O. Box 179, Elk City, ID (US) 83525

( * ) Notice: Subject to any disclaimer, the term of this patent is extended or adjusted under 35 U.S.C. 154(b) by 0 days.

(21) Appl. No.: 10/164,862

(22) Filed: Jun. 6, 2002

(65) Prior Publication Data

US 2004/0032142 A1 Feb. 19, 2004

(51) Int. Cl.⁷ ............................................. B62D 33/63
(52) U.S. Cl. ...................... 296/61; 414/557; 14/71.1
(58) Field of Search .............................. 296/61, 30, 51, 296/57.1, 60, 62, 537; 14/71.1

(56) References Cited

U.S. PATENT DOCUMENTS

| | | | | |
|---|---|---|---|---|
| 5,273,335 A | * | 12/1993 | Belnap et al. .................. 296/61 |
| 5,312,148 A | * | 5/1994 | Morgan ........................ 296/61 |
| 5,791,717 A | * | 8/1998 | Reich et al. ................... 296/61 |
| 5,826,932 A | * | 10/1998 | DeSimone .................... 296/57.1 |
| 5,988,725 A | * | 11/1999 | Cole ............................ 296/61 |
| 6,447,040 B1 | * | 9/2002 | Young, Sr. .................... 296/61 |

* cited by examiner

Primary Examiner—Jason Morrow
(74) Attorney, Agent, or Firm—Donald W. Meeker

(57) ABSTRACT

A fold up ramp assists the loading and unloading of equipment and people onto and off of the bed of a pickup truck. Four individual panels are configured with a unique folding pattern that allows two of the panels to fold into two of the other panels, or nest, to form the tailgate on a pickup truck. The folded and nested panel tailgate is exactly the same size as a standard pickup truck tailgate, varying according to vehicle make and model, and utilizes the same latching mechanism. The ramp panels are fabricated of rectangular metal tubing frames having a metal meshing topside. The panels are interconnected by piano hinges fastened to the underside shared edges between the panels and running the full length of the edge to increase stability and strength.

3 Claims, 4 Drawing Sheets

PICKUP TRUCK FOLDABLE RAMP TAILGATE

BACKGROUND OF THE INVENTION

1. Field of the Invention

The present invention relates to pickup truck tail gates and ramps and in particular to a foldable ramp for a pickup truck which folds up into a pickup truck tailgate having the same dimensions and pivoting and latching means as a standard tailgate and folds out into a smooth ramp from the back of the truck to the ground for loading and unloading objects onto and off of the bed of the pickup truck.

2. Description of the Prior Art

Commonly pickup trucks and other trucks of various dimensions and configurations are used to transport equipment and people. While these vehicles are designed to transport equipment, it is often difficult to load and unload equipment onto and from these vehicles. In particular, it is very difficult to load vehicles such as motorcycles, all terrain vehicles, mowers, jet skis and the like into the bed of common pickup trucks.

Heretofore, various vehicles were loaded into pickup trucks by lifting, which often requires more than one person and requires unnecessary use of energy and risk of injury. Additionally, it has been common in the past to use wood planks to form a ramp from the ground to the back of the truck. Obviously, the use of wood planks carries the risk of the plank(s) slipping or breaking under the load, thus increasing the probability of injury and damage to the equipment. Placing ramps on existing standard tailgates may damage the tailgates.

The prior art also includes various foldable, and extendable ramp assemblies which are connectable to the tailgate of a truck. Some of these prior art devices require that the ramp be connected to the truck for loading and unloading then stored elsewhere when not in use. Then the ramp is subject to loss or theft and the ramp is not always on the pickup truck when it is needed for loading and unloading.

Prior art attempts to solve the ramp problem by using a foldable ramp which either attaches to or substitutes for a tailgate often are thicker or taller than the standard tailgate and take up extra space in the truck or block the loading and unloading of objects over the top of the tailgate. Many prior art ramps do not provide a smooth sturdy and safe ramp forming a strong even support surface over the entire ramp.

U.S. Pat. No. 5,988,725, issued Nov. 23, 1999 to Cole, shows a foldable ramp having a first, second and third rectangular sections contiguous with each other and defining a ramp path having longitudinal and transversal axes. A first hinge group is affixed to both the first and second sections and a second hinge group is affixed to both the second and third sections. The first hinge group has a first axis of rotation on the upper side of the ramp path and extending across the longitudinal axis, and a first rotational range of slightly more than 180 degree. The second hinge group has a second axis of rotation on the under side of the ramp path and extending in a parallel alignment with the first axis of rotation, and a second rotational range of slightly less than 180 degrees. The first and second hinge groups each have a central hinge and outside hinges, and stoppers on the central hinges to limit the rotation of the central hinges a few degrees less than the rotational range of the outside hinges. This configuration causes the ramp to arc longitudinally and transversely upwardly when deployed for increasing the moments of inertia of the ramp.

U.S. Pat. No. 5,342,105, issued Aug. 30, 1994 to Miles, discloses a convertible endgate for a pickup truck which endgate has an elevated endgate forming position and a lowered ramp forming position. The endgate includes front and rear sections pivotally connected together and to the box of the pickup truck. The rear section is more steeply inclined, and the front section is shallower, when the sections are placed in their lowered ramp forming position. Vertically adjustable latches are carried on one of the sections for latching the sections in place in their elevated endgate forming position. The latches are vertically adjustable on slide members and the slide members are vertically adjustable on the frame members of the section. The terminal end of the rear section, i.e. the end which engages a horizontal planar surface when the endgate is disposed in its lowered ramp forming position, includes an L-shaped support member having a horizontal support surface for resting flat against the ground and having a free edge for digging into a bed of a flatbed trailer.

U.S. Pat. Nos. 5,597,195, issued Jan. 28, 1997 to Meek, illustrates a tailgate comprising a plurality of foldable members configured to nest one with the others in an upright closed position and to extend longitudinally from the rear of the truck when in an extended position. A notched section is positioned at a top side of the plurality of foldable members when in an upright position for accommodating a goose neck trailer.

U.S. Pat. No. 5,907,276, issued May 25, 1999 to Lance, concerns a vehicle ramp system of the type connected to a vehicle and moveable from an extended ramp position to a retracted tailgate position. The vehicle ramp system includes a ramp movably connected to said vehicle, wherein said ramp may be moved from a ramp position, extending between the ground and said vehicle, and a tailgate position in which said ramp is retracted and connected to said vehicle; and an alarm system positioned and connected to said truck in a manner such that when said ramp is retracted and in the tailgate position said alarm is disengaged, and when said ramp is extended said alarm system is activated alerting an operator that said ramp is in the extended position. The ramp may be constructed as a single piece or preferable in sections. The ramp is to be constructed of a material such as carbon steel or stainless steel with dimensions capable of supporting equipment which may be loaded onto the vehicle on which the ramp is connected.

U.S. Pat. No. 4,944,546, issued Jul. 31, 1990 to Keller, puts forth a three-section folding ramp that can also serve as an endgate for a truck bed. The ramp has mechanically folding and unfolding legs, so that the user doesn't have to pull the legs open one by one. A special latch allows all three sections to be held together while the folded ramp is being used as an endgate. A special channel allows the folded up ramp to rest when in the open endgate position without damaging the vehicle body.

U.S. Pat. No. 5,133,584, issued Jul. 28, 1992 to McCleary, indicates a folding ramp which replaces the tailgate of a pickup truck. The ramp has two congruent rectangular panels joined by knockdown hinges. The inner panel is pivotally attached to the truck just as the tailgate was. The two panels relatively rotate between an extended planar disposition for use as a ramp and a folded or sandwiched position for use as a replacement gate. The inner panel includes hardware for pivotal attachment to the bed, for latching to the ends of the sidewalls of the truck bed, and for clamping the two panels together when in the gate position. The hinges have removable pins, so that the two panels can be separated; the inner panel can then be used alone as a gate. For trucks with step bumpers, the inner panel may include an extension, comprising a cross bar pivotally attached to the truck, and two parallel telescoping arms slidingly inserted into the side members of the inner panel. The arms bridge the width of the step bumper and remain horizontal; the two panels slope down to the ground from the ends of the arms.

U.S. Pat. No. 5,425,564, issued Jun. 20, 1995 to Thayer, is for a combined tailgate and ramp for a pickup truck. The tailgate can be removed from the truck and used as a loading ramp. As a ramp, one end of the tailgate is placed on the bumper or bed of the truck. The tailgate is laterally adjustable to form a ramp which accommodates the loading of vehicles having different track sizes or different wheel bases.

U.S. Pat. No. 5,791,717, issued Aug. 11, 1998 to Reich et al., claims a folding ramp for attachment to a pickup truck tailgate wherein the structural support is provided by rigid parallel ribs, each rib hinged to fold flat against the underside of the ramp, and divided into separate sections which fold with the separate panels. Preferably there are two sets of parallel rib sections, each formed of sections connected by short flexible cable lengths.

U.S. Pat. No. 5,752,800, issued May 19, 1998 to Brincks et al., describes a pickup truck ramp/bed extender adapted to be mounted upon inside bed surface of a tailgate. The ramp/bed extender is comprised of collapsible sections which, when fully extended and supported by supplementary rigid structures, provide a quick, convenient, and sturdy loading surface whereupon small machinery such as motorcycles, lawnmowers and snow mobiles may be loaded into the truck bed with little effort. The ramp/bed extender may be transported in two different positions. In the first transport position the ramp/bed extender is fully collapsed and secured against the inside bed surface of the closed tailgate. While in this position, the tailgate may be operated in the same manner as if the ramp/bed extender were not present. In the second transport position, the tailgate is lowered to the opened position with the ramp/bed extender forming a substantially enclosed structure thereby containing the items disposed in the now enlarged cargo area of the truck bed.

U.S. Pat. No. 5,273,335, issued Dec. 28, 1993 to Belnap et al., is for a combination ramp and tailgate structure for installation and use in pickup trucks in which the structure would replace a conventional tailgate. The ramp/tailgate structure includes first, second, third and fourth generally rectangular frame members, the first and second of which are slidably coupled together to move between a nested or collapsed position and an extended position, and a third and fourth of which are likewise slidably coupled together to move between a nested or collapsed position and an extended position. The slidable movement between frame members is in the planes thereof so that a low profile, compact configuration may be maintained when in the collapsed position, yet allows sufficient thickness of the members to permit the ramp to support heavy loads. When the frame members are in nested positions and when the third frame member is pivoted into a position against and parallel with the second frame member, the frame members may be pivoted as a unit to an upright position to serve as a conventional tailgate. When the frame members are moved respectively to their extended positions and when the third frame member is pivoted so that all frame members are generally parallel in the same plane, with a rearward side or edge of the fourth frame member in contact with the ground, the ramp/tailgate serves as a ramp extending from the ground to the bed of the pickup truck.

It would be a benefit, therefore, to have a ramp which is connected to the rear of a truck and extendable therefrom for loading and unloading the truck. It would be a further benefit to have a ramp which may be retracted from the extended ramp position and moved to a closed position in which the ramp serves as a tailgate of a truck. It would still be a further benefit to have a smooth sturdy and safe foldable ramp having a strong even support surface over the entire ramp.

SUMMARY OF THE INVENTION

The primary object of the present invention is to provide a fold up ramp for a pickup truck with a unique folding pattern that allows the four parts of the ramp to fold into one another, or nest, to form the tailgate on the pickup truck which is exactly the same size as the standard tailgate and utilizes the same latching mechanism.

Another object of the present invention is to provide a combination pickup truck tailgate assembly and foldable ramp that unfolds to assist the loading and unloading of equipment and people onto and off of the bed of a pickup truck when extended and when folded up, forms a conventionally sized and operated pickup truck tailgate.

An additional object of the present invention is the strength and durability of the ramp tailgate made from 1¼" square metal tubing, expanded metal mesh decking, sized to support a minimum of 1500 lbs., and panels interconnected by piano hinges running the full width of the panel, rated at 160 lb. per linear inch capacity.

A related object of the present invention is that the unit, when folded up, is meant to be used as a standard tailgate; alternately, when it is unfolded, it is meant to be used as a smooth, sturdy, flat ramp assisting the loading and unloading of the pickup truck with the advantage of having metal mesh sheeting covering the entire surface of the ramp, instead of having only two separate tire ramps which can be difficult and hazardous to navigate.

An associated object of the present invention is that two of the four panels fold up and nest inside the other two, to keep the whole structure from being bulky and awkward to handle.

A further object of the present invention is it's easy-to-use nature. The fold up tailgate will latch closed in a standard conventional way with the four panels unfolding flat and then folding up by nesting into one another easily and efficiently allowing for relatively quick deployment.

One more object of the present invention is that it is a single unit rather than a multiple ramp configuration. A single ramp decreases the opportunity to loose a section and, limits the chance of slippage to cause a rollover. Therefore, it is much safer to load numerous and various items into and out of the flatbed of the vehicle.

Another corollary object of the present invention is to provide a variety of foldable ramps, each having latching hardware to match each model of pickup truck, thereby allowing the latch placed on the foldable ramp to change according to the specifications of the style and make of the pickup truck so that the configurations are mated.

In brief, a foldable ramp for a pickup truck with four panels hinged together by piano hinges folds together with the two outer end panels nesting within the two inner end panels to form a tailgate assembly having the same dimensions and latches and hinges as a conventional pickup truck tailgate.

In a preferred embodiment, the ramp includes a first panel having a truck end connected by hinges to the pickup in a conventional manner, using a conventional latch, and a second panel connected by hinges to the first panel, a third panel connected by hinges to the second panel, and a fourth panel connected by hinges to the third panel. Each panel is fastened to the next by a continuous piano hinge that has a 160 lb. per linear inch capacity. These piano hinges are positioned on the bottom of the formed ramp panels and extend across the width of the ramp panel to form smooth, strong connections between them in a manner such, that when extended, the ramp panels form a sturdy, unitary platform.

Each panel is made from rectangular 1¼" steel tubing forming a frame with expanded metal grating attached to the frame on top of the panel to form the deck. All metal should be sized to support a minimum of 1500 lbs. The third and fourth panels are reduced in size so that upon folding up the ramp to form the tailgate assembly, the third panel fits inside of the first panel (on the underside of the panel) and the fourth panel fits inside the frame of the second panel (also on the underside of the panel,) thereby creating a very strong foldable ramp which will not be unduly bulky. The second panel is shorter than the first, to position the third and fourth panels for nesting. The ramp panels fold into a nested configuration producing a tailgate assembly which will weigh approximately 120 lbs. and will vary in measurements of height, thickness, and width according to the tailgate specifications for the individual model of pickup truck. The latching mechanism of the tailgate ramp will also be structured to mate with the existing hardware of the pickup truck flatbed and will vary according to the make and model of the truck.

An advantage of the present invention is that it is made to mimic the exact size of a vehicle's original tailgate.

A further advantage of the present invention is the ability to change the latch hardware on the foldable ramp to mate with the specific tailgate latch configuration on the pickup truck according to the style and make of the vehicle.

Another advantage of the present invention is that it folds out into a smooth, sturdy ramp because the metal mesh sheeting covers the entire surface of the ramp instead of having only two separate tire ramps which can be difficult and hazardous to navigate.

A related advantage of the present invention is that the structure is greater than the prior art in strength and durability due to the use of square metal tubing, metal mesh sheeting covering the entire surface of the ramp and, piano hinges attached to the entire length of the sectional creases.

An additional advantage of the present invention is that the individual ramp panels nest inside one another to keep the whole structure from being bulky and awkward to handle.

One more advantage of the present invention is that it is a single unit rather than a multiple ramp configuration. A single ramp decreases the opportunity to loose a section and, limits the chance of slippage to cause a rollover. Therefore, it is much safer to load numerous and various items into and out of the flatbed of the vehicle.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
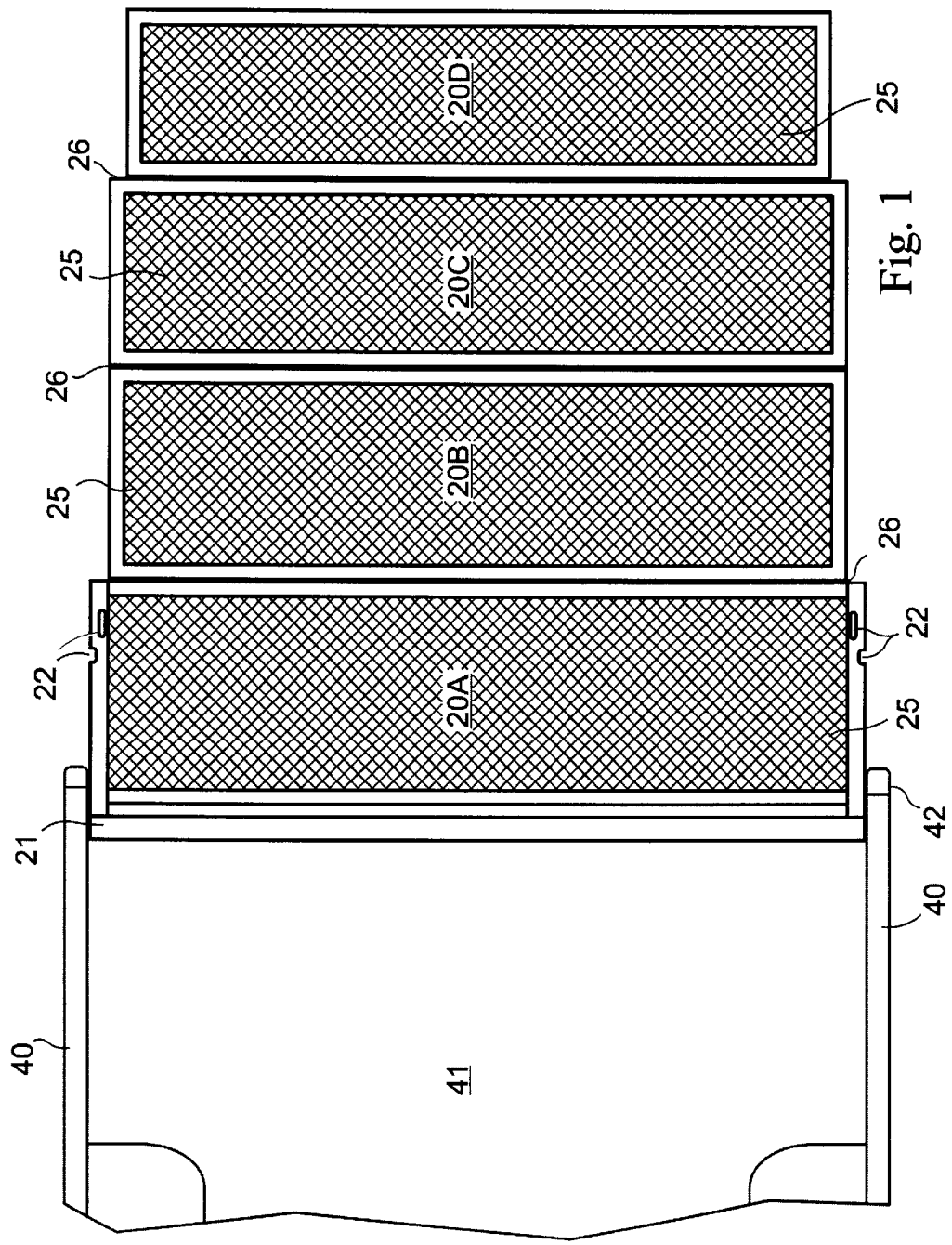
FIG. 1 is a plan view showing the hinged panels of the invention folded out into a ramp configuration between a pickup truck bed and the ground.
Figure 2:
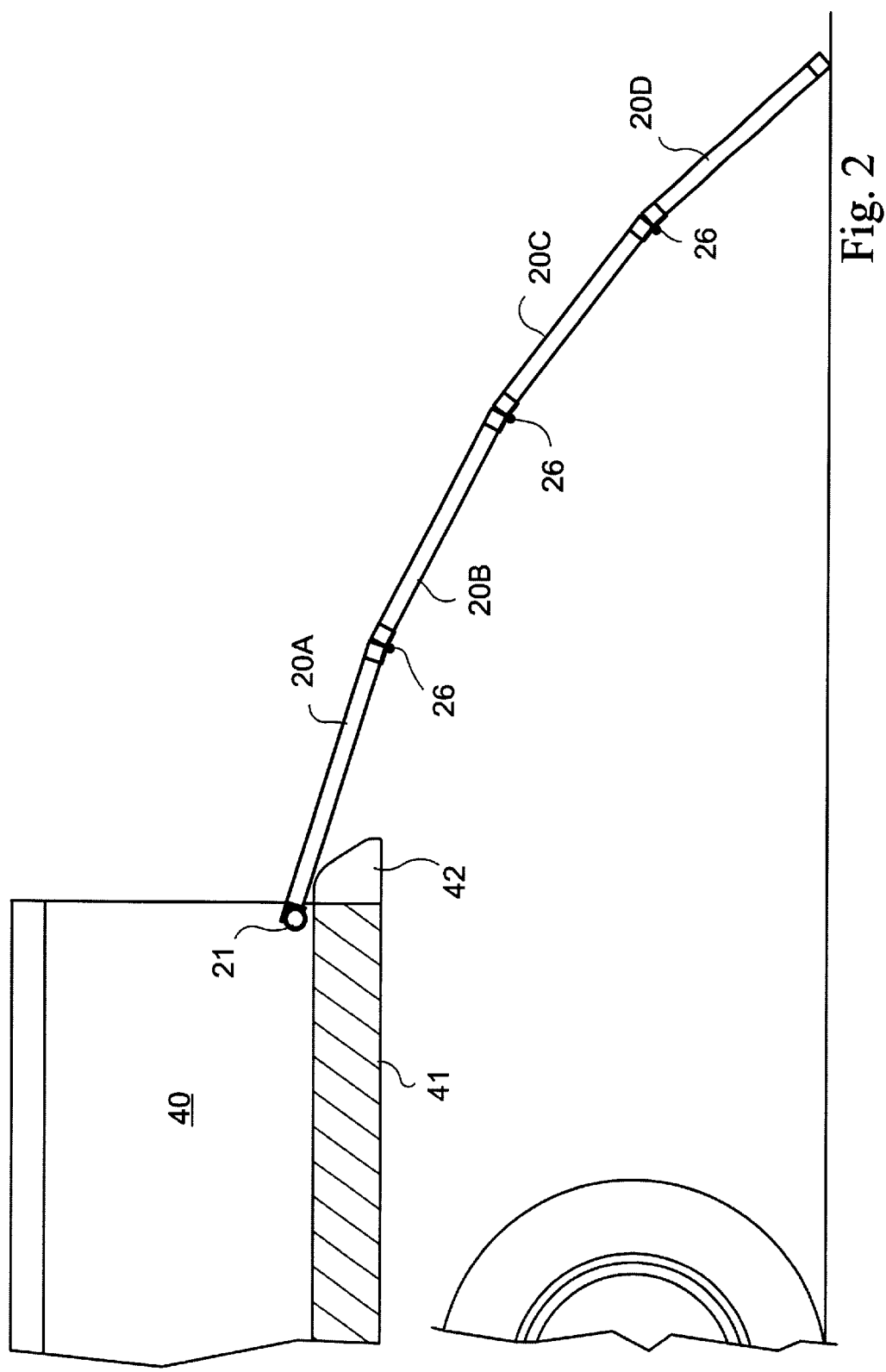
FIG. 2 is a side elevational view of the folded out panels in the ramp configuration of FIG. 1.
Figure 3:
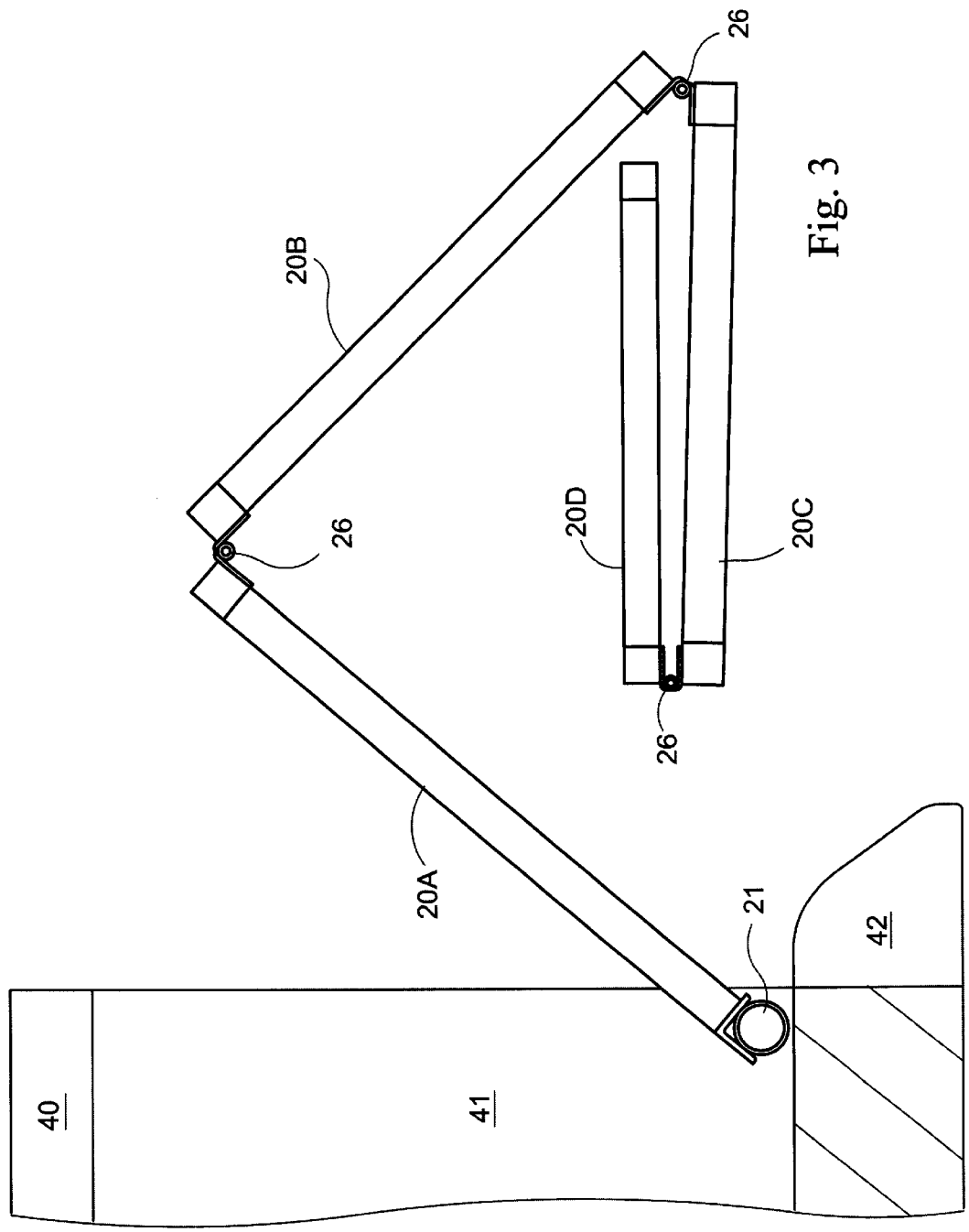
FIG. 3 is a side elevational view of the panels of the invention partially folded between the ramp configuration and a nested tailgate configuration.
Figure 4:
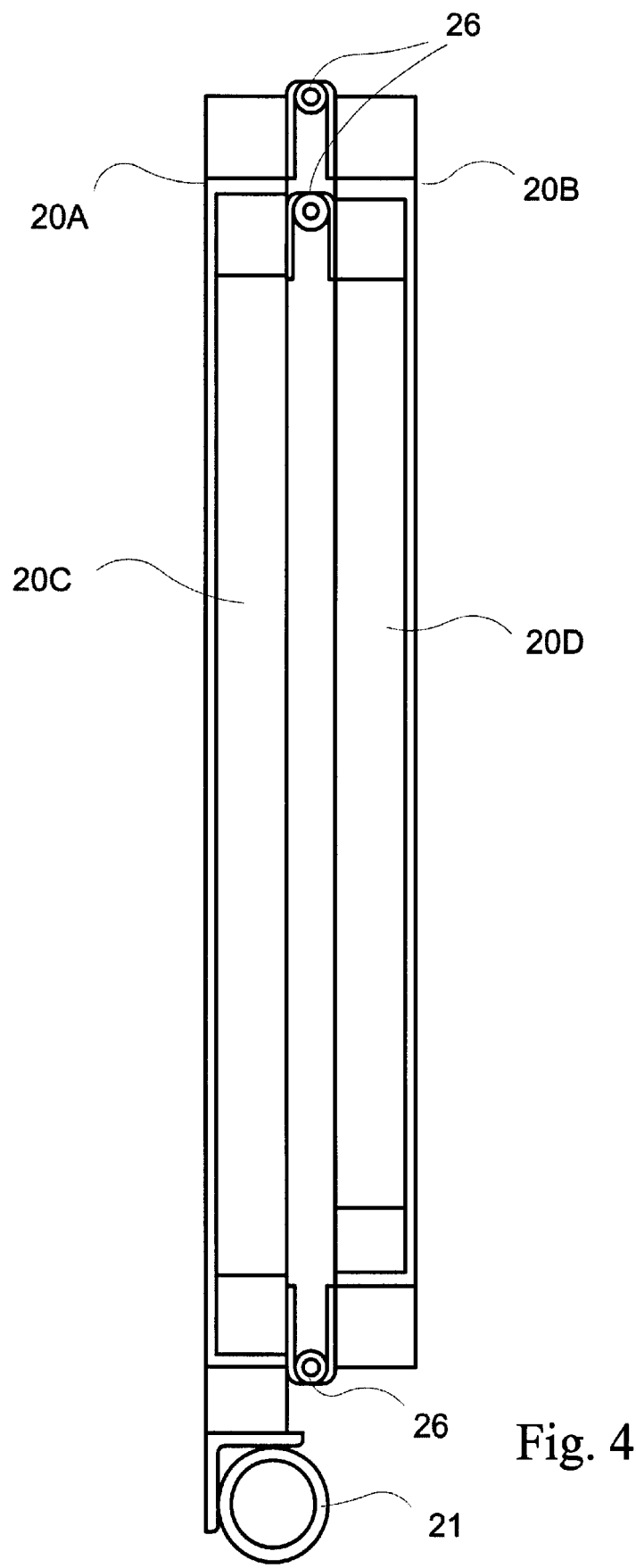
FIG. 4 is a side elevational view of the panels of the invention folded up into the nested pickup truck tailgate configuration.

In FIGS. 1–4, a foldable pickup truck tailgate and ramp device comprised of a series of rigid panels 20A–D is interconnected by hinge means 26. The panels 20A–D are capable of folding out into a ramp configuration interconnecting a pickup truck bed 41 to an adjacent ground surface, as seen in FIGS. 1 and 2. The panels 20A–D are also capable of folding up into a pickup tailgate assembly configuration having a conventional latch 22 and conventional hinge 21 for attaching to a pickup truck, replacing a conventional tailgate. At least one of the panels is a nestable panel 20C, 20D capable of fitting within at least one other of the panels 20A, 20B so that in the pickup tailgate assembly configuration, as seen in FIG. 4, the device is the same size as a conventional pickup truck tailgate.

In FIGS. 1–4, the hinge means 26 is comprised of a piano-type hinge extending along the entire interconnecting edge of each of the panels 20A–D to one another. The panel 20A which additionally shares an edge with the pickup truck flatbed 41 is interconnected by a conventional hinge 21 for pickup trucks on that shared side.

In FIG. 1, each of the panels 20A–D is comprised of a rigid metal frame having an attached layer of metal meshing 25 attached by conventional means along a top side of each of the panels 20A–D in the ramp configuration.

In FIGS. 3–4, two of the panels 20C, 20D are configured in the size and shape of the interior dimensions of the frame of two of the other panels 20A, 20B so that the nestable panels 20C, 20D fits nestably within the interior dimensions of the frame of the other panels 20A, 20B below the layer of metal meshing 25 attached to the top sides of all the panels 20A–D.

In FIGS. 1–4, the device is comprised of a first panel 20A attached by a standard hinge mechanism 21 to the pickup truck, a second panel 20B hingedly attached by hinge 26 to the first panel 20A, a third panel 20C hingedly attached by hinge 26 to the second panel 20B, and a fourth panel 20D hingedly attached by hinge 26 to the third panel 20C. The third and fourth panels 20C, 20D are configured in the size and shape of the interior dimensions of the frames of the first and second panels 20A, 20B so that, in the pickup truck tailgate assembly configuration, the third panel 20C fits nestably within the first panel 20A and the fourth panel 20D fits nestably within the second panel 20B so that the thickness of the device is equal to the thickness of a standard pickup truck tailgate, as seen in FIG. 4.

In FIGS. 1–4, the frame is fabricated of square metal tubing.

In FIG. 1, the panel closest to the pickup truck 20A is comprised of a standard latching device 22 meant to allow the closing and locking of the foldable ramp when it is in the tailgate configuration.

It is understood that the preceding description is given merely by way of illustration and not in limitation of the invention and that various modifications may be made thereto without departing from the spirit of the invention as claimed.

What is claimed is:

1. A foldable pickup truck tailgate and ramp device comprising:

a series of rigid panels interconnected by hinge means, the panels capable of folding out into a ramp configuration interconnecting a pickup truck bed to an adjacent ground surface and capable of folding up into a pickup tailgate assembly configuration having a conventional latch and hinge assembly for attaching to a pickup truck to replace a conventional tailgate, at least one of the panels comprising a nestable panel capable of fitting within at least one other of the panels so that in the pickup tailgate assembly configuration, the device is the same size as a conventional pickup truck tailgate, each of the panels comprising a rigid metal frame having an attached layer of metal along a top side of each of the panels in the ramp configuration, the at least one nestable panel configured in the size and shape of an interior of a frame of the at least one other panel so that the nestable panel fits nestably within the frame of the at least one other panel below the layer of metal attached to the top side of the at least one other panel;

wherein the device comprises a first panel hingedly attached to the pickup truck, a second panel hingedly attached to the first panel, a third panel hingedly attached to the second panel, and a fourth panel hingedly attached to the third panel, the third and fourth panels being configured in the size and shape of the interior of the frames of the first and second panels, so that in the pickup truck tailgate assembly configuration, the third panel fits nestably within the first panel and the fourth panel fits nestably within the second panel so that the thickness of the device is equal to the thickness of a standard pickup truck tailgate.

2. The device of claim 1 wherein the hinge means comprises a piano-type hinge extending along the entire interconnecting edge of each of the panels.

3. The device of claim 1 wherein the frame is fabricated of rectangular metal tubing with an expanded metal mesh attached to a top surface of the frame.

* * * * *